(12) United States Patent
Suhr et al.

(10) Patent No.: US 11,903,362 B2
(45) Date of Patent: Feb. 20, 2024

(54) MEASURING CELL AND ASSEMBLY HAVING AT LEAST ONE MEASURING CELL FOR MEASURING THE CONDUCTIVITY AND/OR IMPEDANCE OF MILK DURING A MILKING PROCESS

(71) Applicant: GEA Farm Technologies GmbH, Bönen (DE)

(72) Inventors: Olaf Suhr, Oelde (DE); Christopher Eugene Richards, White Bear Lake, MN (US); Patrick Sonntag, Lennestadt (DE); Philipp Camminady, Lennestadt (DE)

(73) Assignee: GEA Farm Technologies GmbH, Bönen (DE)

( * ) Notice: Subject to any disclaimer, the term of this patent is extended or adjusted under 35 U.S.C. 154(b) by 696 days.

(21) Appl. No.: 17/052,005

(22) PCT Filed: May 9, 2019

(86) PCT No.: PCT/EP2019/061921
§ 371 (c)(1),
(2) Date: Oct. 30, 2020

(87) PCT Pub. No.: WO2019/219498
PCT Pub. Date: Nov. 21, 2019

(65) Prior Publication Data
US 2021/0360891 A1 Nov. 25, 2021

(30) Foreign Application Priority Data
May 15, 2018 (DE) .................. 10 2018 111 676.4

(51) Int. Cl.
*A01J 5/013* (2006.01)
*G01N 27/07* (2006.01)

(52) U.S. Cl.
CPC ............ *A01J 5/0133* (2013.01); *G01N 27/07* (2013.01)

(58) Field of Classification Search
CPC .............................. A01J 5/0133; G01N 27/07
See application file for complete search history.

(56) References Cited

U.S. PATENT DOCUMENTS

| 6,161,502 A | 12/2000 | Simpson et al. |
|---|---|---|
| 8,967,083 B2 | 3/2015 | Hoey |
| 2017/0150695 A1* | 6/2017 | Meillan .................... A01J 5/01 |

FOREIGN PATENT DOCUMENTS

| CA | 3097509 A1 | 11/2019 |
|---|---|---|
| CN | 112165858 A | 1/2021 |

(Continued)

OTHER PUBLICATIONS

International Search Report for PCT Application No. PCT/EP2019/061921 dated May 9, 2019, 10 pages.

(Continued)

*Primary Examiner* — Farhana A Hoque
(74) *Attorney, Agent, or Firm* — PATENT PORTFOLIO BUILDERS PLLC

(57) ABSTRACT

A milk measuring cell having an inlet channel and an outlet, a cavity, a barrier which protrudes from a bottom of the cavity and divides the cavity into a measurement trough (13) on the side of the inlet channel and an outlet channel on the side of the outlet, wherein a peak of the barrier is positioned below an elevation of the inlet channel.

20 Claims, 3 Drawing Sheets

(56) References Cited

FOREIGN PATENT DOCUMENTS

| | | | |
|---|---|---|---|
| DE | 4007327 | C1 | 7/1991 |
| DE | 102018111676 | A1 | 5/2018 |
| EP | 0424801 | A1 | 5/1991 |
| EP | 3793348 | A1 | 3/2021 |
| ES | 1075767 | * | 12/2011 |
| ES | 1075767 | U | 12/2011 |
| GB | 1314327 | A | 4/1973 |
| WO | 2003/040704 | A1 | 5/2003 |
| WO | 2019/219498 | A1 | 11/2019 |

OTHER PUBLICATIONS

International Search Report for PCT Application No. PCT/EP2019/061921 dated Aug. 13, 2019, 2 pages.

* cited by examiner

MEASURING CELL AND ASSEMBLY HAVING AT LEAST ONE MEASURING CELL FOR MEASURING THE CONDUCTIVITY AND/OR IMPEDANCE OF MILK DURING A MILKING PROCESS

CROSS REFERENCE TO RELATED APPLICATION

This application is a national phase application under 35 U.S.C. 371 of PCT Application No. PCT/EP2019/061921 filed May 9, 2019, which claims priority to German Application No. 10 2018 111 676.4 filed May 15, 2018, the disclosures of which are incorporated by reference herein.

FIELD AND BACKGROUND OF THE INVENTION

The invention relates to a measuring cell for measuring a conductivity and/or impedance of milk during a milking process, a cavity being formed between an inlet and an outlet of the measuring cell, in which cavity a measurement trough is arranged, in which at least part of a milk supplied to the measuring cell via an inlet channel collects and in which electrodes are arranged to determine a conductivity and/or impedance of the milk. The invention further relates to an arrangement of at least one such measuring cell for measuring the conductivity and/or impedance of milk during the milking process.

Conductivity and impedance measurements are a fast and therefore in-situ measurement method during a milking process to detect inflammation in the udder and teats of a dairy animal from the milked milk. The detection of such inflammations, e.g. mastitis, is important in dairy animals in order, on the one hand, to be able to treat the animals as quickly as possible and, on the other hand, to exclude milk with a high cell content from further use. Conductivity measurement can be carried out individually for each teat, for cows for example quarter-individually, as an inflammation may only affect individual teats and therefore only the milk milked from the corresponding teat is affected.

The printed publication DE 40 07 327 C1 describes such a conductivity measurement, which is carried out at low measuring frequencies below 0.2 Hertz (Hz), i.e. essentially static in the case of direct current. The conductivity measurement is carried out inside a measuring chamber, which contains a collecting vessel into which milk enters through an inlet and which has a shut-off valve at its outlet, so that when the valve is shut off, milk is collected in the measuring chamber to carry out the measurement.

The described arrangement is complex and difficult to construct in a compact form because of the assigned valve that is to be controlled. In addition, the flow of milk into the measuring chamber leads to a measurement with highly noisy and/or varying measured values. This is especially noticeable when highly foaming milk is flowing in.

A further measuring arrangement for measuring conductivity during the milking process is known from the printed publication U.S. Pat. No. 8,967,083 B2. In this measuring arrangement, individual smaller measuring cells, open at the top, are arranged in the upper area of a milk collection bowl, into which measuring cells milk from each teat flows from supply lines in the lid of the measuring col-lection bowl. Milk overflowing from the measuring cells as well as milk leaving the measuring cells from an emptying hole in their base then collects in the milk collection bowl, from where it can be conveyed further together. It is advantageous that in this way four measuring cells for the four teats of a cow can be arranged together within one milk collection bowl.

Individual valves for each measuring cell, as required for the measuring chamber mentioned above, are not needed. However, the problem of high noise levels and variations in measured values, caused, among other things, by entering air bubbles, also exists with this measuring arrangement.

An inline measuring cell that can be used in the flow of a milk line is known from the printed publication WO 03/040 704 A1. This measuring cell is not de-signed for electrical, but for optical measurements. With this measuring cell, a channel guided through the measuring cell widens downwards in the middle area of the measuring cell in a trough shape. A measuring window for optical measurement is arranged approximately in the middle area of the trough-shaped widening. The downward facing trough-shaped widening is not necessarily formed over the entire cross-sectional width of the line but is preferably narrower to allow measurement in transmitted light. This measuring cell also has the described problem of entering air bubbles.

SUMMARY OF THE INVENTION

The present invention is directed to a measuring cell of the type mentioned above, with which conductivity measurements during the milking process can be carried out with the least possible variation of the measured values and with a low noise level. The measuring cell is also compact in design. The invention also includes a measuring arrangement having at least one such measuring cell.

A measuring cell of the type mentioned above is characterized in that between the inlet channel and the outlet, a barrier is arranged which protrudes from a bottom of the cavity and which divides the cavity into the measurement trough on the side of the inlet channel and an outlet channel on the side of the outlet, wherein a peak of the barrier is positioned below an elevation of the inlet channel.

Milk flowing in through the inlet channel separates into a milk flow with a higher foam content and a milk flow with a lower foam content, wherein the milk flow with the higher foam content tends to have a flatter flight curve that extends above the barrier. The milk flow with the lower foam content tends to move in a faster falling flight curve and enters the measurement trough. The milk flow above the peak of the barrier enters directly into the discharge channel.

The barrier thus separates milk with a low foam content for the measurement. The lower foam content reduces the influence of rising bubbles on the measurements. A milk level in the measurement trough rises until excess milk flows over the peak of the barrier. This ensures a constant filling level in the measurement trough for the measurements then carried out. A fluctuating filling level would have a direct effect on the measured values of the conductivity and/or impedance measurements. In addition, the overflow of the milk over the barrier ensures that the milk in the measurement trough is constantly ex-changed and essentially corresponds in its properties and composition to the milk currently flowing into the inlet.

In an advantageous design of the measuring cell, the electrodes are arranged in a front half and preferably in a front third of the measurement trough. In this front area of the measurement trough, as seen in the direction of milk flow, the smallest milk movements and the lowest proportion of air bubbles in the milk to be measured can be observed due to the flow, which means that the measurement provides particularly constant and noise-free measurement results.

In another advantageous design of the measuring cell, the inlet channel opens into the cavity laterally at a front wall of the measurement trough, wherein an angle of at least 80° is formed between the inlet channel and the front wall. Preferably, the front wall of the measurement trough extends vertically in the operating position. This also allows the electrodes for the conductivity and/or impedance measurement to be arranged as far away from the barrier as possible and thus in a flow-technically favorable position with regard to a slight milk movement. A further preferred arrangement is formed as an edge between the inlet channel and the front wall, which edge creates a transition from the inlet channel into the cavity.

In another advantageous design of the measuring cell, a rear wall of the cavity opposite the inlet channel is inclined. This rear wall is also further preferably located sufficiently far behind the barrier in the direction of milk flow. This ensures that the impinging milk flow with the higher foam content does not or as little as possible splash back in the direction of the measurement trough.

In another advantageous design of the measuring cell, a discharge channel runs through the barrier, connecting the measurement trough to the discharge section. The discharge channel then ensures that the measurement trough is emptied after the end of the milking process and a cleaning cycle and thus al-so contributes to the milk in the measurement trough being exchanged and essentially corresponding in its properties and composition to the milk flowing into the inlet. The cross-section of the discharge channel is preferably chosen in such a way that when the milk flow with the lower foam content flows into the measurement trough, even with a low milk flow, more milk enters the measurement trough than flows out through the discharge channel. At the beginning of a milking process the measurement trough fills with milk up to the level of the peak of the barrier.

In another advantageous design of the measuring cell, the inlet channel, a bottom of the measurement trough, the discharge channel and/or the dis-charge section are inclined in an operating position. In this way a complete emptying of the measuring cell is supported.

In another advantageous design of the measuring cell, impedance electrodes and/or conductivity electrodes are available as electrodes. In the context of the application, a conductivity measurement is understood to be a measurement carried out with direct current or in a low frequency range of a few tens of kilo-hertz (kHz) maximum. An impedance measurement is understood to be a measurement in a higher frequency range of at least some 10 kHz, preferably at least 100 kHz and especially preferably several 10 megahertz (MHz). These two measurements can be carried out simultaneously and/or consecutively with the mentioned electrodes, wherein the impedance electrodes are used for high-frequency impedance measurement and the conductivity electrodes for low-frequency conductivity measurement.

In addition, a temperature sensor can be arranged in the measurement trough, which in a preferred design can also be formed integrally with one of the electrodes. The temperature sensor is used to determine the current temperature of the milk in order to be able to take temperature effects into account when evaluating the conductivity and/or impedance measurement(s).

In another advantageous design of the measuring cell, an evaluation circuit connected to the electrodes is arranged to determine an impedance and/or a conductivity below the measurement trough. This allows short conduction paths between the electrodes and the evaluation circuit, which minimizes interference with the signals to be evaluated and thus increases the quality of the measurements.

A measuring arrangement according to the invention for measuring a conductivity of milk during a milking process is characterized by at least two such measuring cells arranged next to or above each other. The advantages mentioned before in connection with the measuring cell result from the compact design.

In an advantageous design of the measuring arrangement, the at least two measuring cells arranged next to or above each other are aligned in opposite directions. This allows the measuring cells to be positioned at a small distance from each other, while still providing sufficient installation space for connecting the inlets and outlets.

In another advantageous design, the measuring arrangement has a common housing base body for all measuring cells, in which housing base body the measurement trough, the barrier and a lower part of the discharge section as well as the outlet are formed in each case. Preferably at least one upper housing part is also provided, in which at least one inlet, the inlet channel and the rear wall are formed. This creates a particularly compact design with few individual parts. Further preferably, a common evaluation unit for all measuring cells can also be provided. Parts of the evaluation unit only need to be present in a single configuration and can still be used for all measuring cells, which reduces the number of components required for the evaluation unit.

BRIEF DESCRIPTION OF THE DRAWINGS

The invention is explained in more detail below by reference to exemplary embodiments with the aid of three figures, wherein.

DETAILED DESCRIPTION OF THE DRAWINGS

Figure 1:
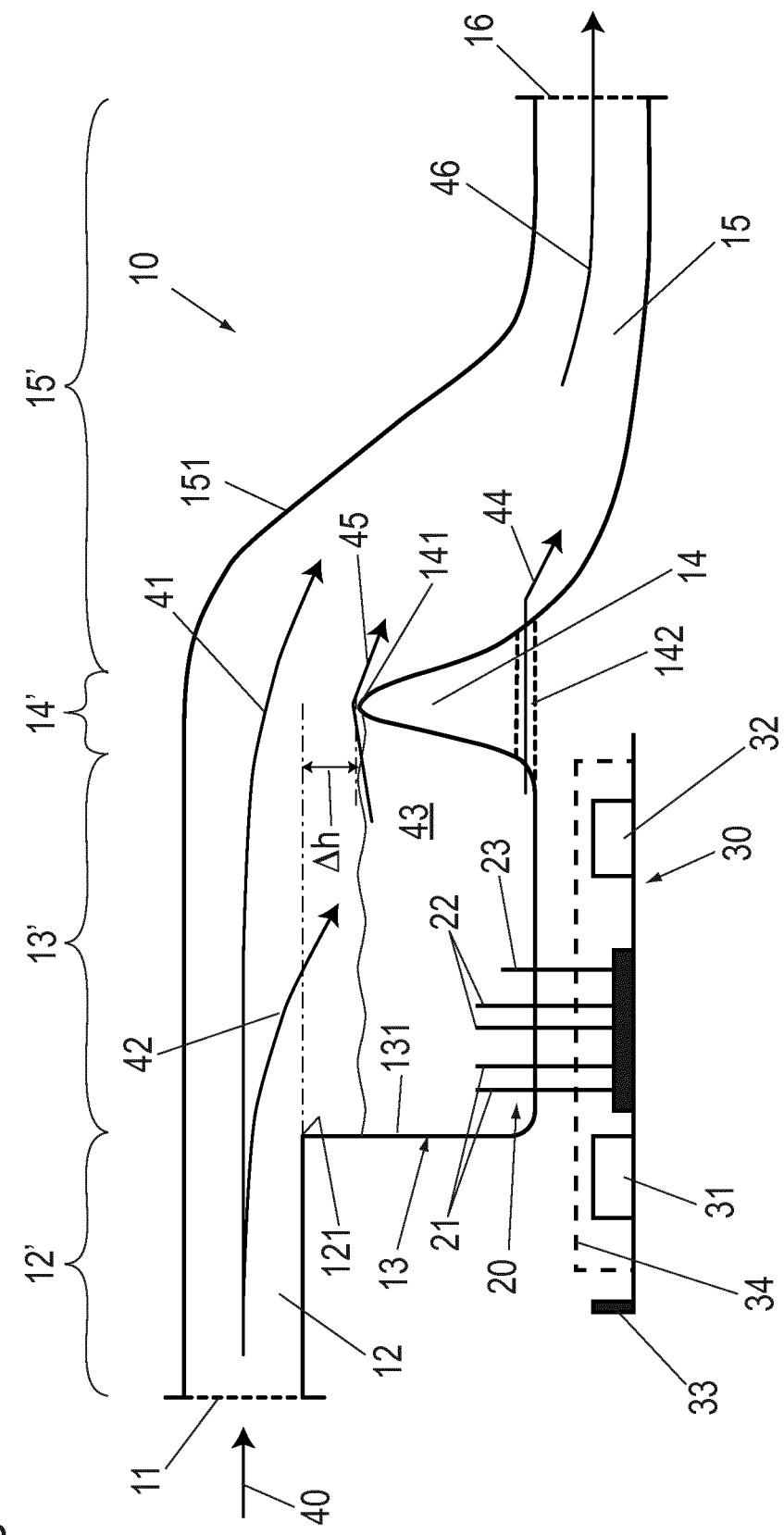
FIG. 1 shows a schematic sectional view of a measuring cell with an electrode and sensor arrangement and an evaluation unit.

FIG. 1 shows in a schematic cross-sectional drawing an exemplary embodiment of a measuring cell 10 for carrying out conductivity and impedance measurements during a milking process.

Measuring cell 10 has an inlet 11 for incoming milk and an outlet 16 on the opposite side of a housing of the measuring cell 10. In a mounting position that essentially corresponds to the orientation shown in the figure, the outlet 16 is positioned lower than the inlet 11. Between the inlet 11 and the outlet 16, the measuring cell 10 can be divided into four different sections: An inlet section 12' adjoining the inlet 11 with an inlet channel 12, a measuring section 13' with a measurement trough 13, a barrier section 14' with a barrier 14, and an outlet section 15' with an outlet channel 15 which opens into the outlet 16. The subdivision of the measuring cell 10 into the different sections 12' to 15' is indicated at the upper edge of FIG. 1.

The inlet channel 12 is connected to inlet 11 with essentially the same cross-section. The cross-section of the inlet 11, like that of the inlet channel 12, is preferably round in order to avoid edges in which milk residues could collect. In the illustrated FIG. 1 the inlet channel 12 is aligned horizontally. In an implementation of the measuring cell 10, a slight inclination of the inlet channel 12 in the direction of the outlet 16 can be provided to allow milk residues to flow off in the direction of the outlet 16.

The inlet channel 12 opens into the measuring section 13', in which the cross-section of the measuring cell 10 widens considerably towards the bottom. The transition from the inlet channel 12 to the measuring section 13' is formed by an edge 121, which in the example shown is formed in a sharp-edged manner, but can also be formed in a rounded manner in alternative designs. Below the edge 121, a front wall 131 of the measurement trough 13 is connected, which, as shown in the exemplary embodiment, preferably extends vertically downwards. On the rear side, as viewed in the direction of milk flow, the measuring section 13' is bounded by the barrier 14, thus forming the measurement trough 13.

The barrier 14 has a peak 141 which is lower by a height difference □h than the extension of the lower edge of the inlet channel 12. In the area of barrier 14, therefore, the measuring cell 10 has a cross-section which widens in particular downwards compared with the cross-section of the inlet channel 12, but less deep than in the area of the measuring section 13', thus forming the measurement trough 13 mentioned above.

Milk 40 flowing into the inlet 11 and through the inlet channel 12 enters the measuring section 13'. In the milking process, the milk is moved in a pulsating manner at high speed through the milk line and thus also through the inlet channel 12 due to the pulsation milking process and the vacuum applied to the milk lines and thus also to the measuring cell 10. The milk therefore does not run over the edge 121, but splashes into the free space above the measurement trough 13, separating a milk flow 41 with a higher foam content from a milk flow 42 with a lower foam content in such a way that the milk flow 41 with the higher foam content tends to have a flatter flight curve which runs above the barrier 14. The milk flow 42 with the lower foam percentage tends to move in a faster falling flight curve and enters the measurement trough 13.

Within the outlet section 15', the rear wall of the outlet channel 15, as viewed in the direction of milk flow, is designed as baffle wall 151 for the milk flow 41 with the higher foam content. The baffle wall 151 preferably extends in an inclined manner and, as seen in the milk flow direction, is located sufficiently far behind the barrier 14 so that the impinging milk flow 41 with the higher foam content does not spray back in the direction of the measurement trough 13. The milk flow 41 with the higher foam content is then diverted through the out-let channel 15 as part of an out-flowing milk 46. This can be done horizontally, as shown, or also vertically or inclined.

Due to the separation into the milk flow 41 with the higher foam content and the milk flow 42 with the lower foam content, milk 43 collects in the measurement trough 13, which also has only a low foam content and thus as few air bubbles as possible. The measurement trough 13 is hydraulically connected to the outlet channel 15 via a discharge channel 142, which leads through the barrier 14.

The cross-section of the discharge channel 142 is selected so that when the milk flow 42 with the lower foam content flows into the measurement trough 13, even with a low milk flow, more milk enters the measurement trough 13 than flows out through the discharge channel 142. At the beginning of a milking process, the measurement trough 13 is therefore filled with the milk 43 up to the level of the peak 141 of the barrier 14. Then, due to the inflow of the milk flow 42 with the lower foam content, part of the milk 43 is displaced as over-flowing milk 45 from the measurement trough 13 over the peak 141 in the di-rection of the outlet 16, so that the milk 43 is constantly exchanged in the measurement trough 13 and essentially corresponds in its properties and composition to the milk 40 currently flowing into the inlet 11.

In addition, it is ensured that the level of the milk 43 in the measurement trough 13 is at the level of the peak 141 as described and shown in FIG. 1 during a milking process. The discharge channel 142 then ensures that the measurement trough 13 is emptied after the end of the milking process and a cleaning cycle and thus also contributes to the milk 43 in the measurement trough 13 being replaced and essentially corresponding in its properties and composition to the milk 40 flowing into the inlet 11. The milk flow 44 flowing out of the discharge channel 142 then combines with the milk 45, which may optionally flow over the peak 141, and optionally with the milk flow 41 with the higher foam content to form the milk 46 flowing out of the measuring cell 10.

An electrode and sensor arrangement 20 for carrying out the conductivity and/or impedance measurement(s) is arranged in the measurement trough 13. In the exemplary embodiment shown, two pairs of electrodes and a temperature sensor are provided in the electrode and sensor arrangement 20, specifically two impedance electrodes 21, two conductivity electrodes 22 and a temperature sensor 23. The temperature sensor 23 is used to determine the cur-rent temperature of the milk in order to be able to take temperature effects into account when evaluating the conductivity and/or impedance measurement(s). In a further development of the electrode and sensor arrangement 20 shown, it may be provided to integrate the temperature sensor 23 in one or more of the electrodes 21, 22 in order to actually determine the temperature at the location of the conductivity and/or impedance measurement(s).

In the context of the application, conductivity measurement is understood to be a measurement carried out with direct current or in a low frequency range of a few tens of kilohertz (kHz) maximum. Impedance measurement is understood to be a measurement in a higher frequency range of at least some 10 kHz, preferably at least 100 kHz and especially preferably several 10 megahertz (MHz). These two measurements can be performed simultaneously with the electrode and sensor arrangement 20 shown, wherein the impedance electrodes 21 are used for high-frequency impedance measurement and the conductivity electrodes 22 for low-frequency conductivity measurement. In principle, the measurement can be carried out simultaneously. To prevent crosstalk between the different measuring methods and mutual interference, a measurement can also be carried out quasi-simultaneously in time windows in quick succession or alternately.

The electrode and sensor arrangement 20 is preferably arranged in a front area of the measurement trough 23, i.e. in an area of the measurement trough 13 that is closer to the front wall 131 than to the barrier 14. This measuring range is particularly preferably arranged in a front third of the measurement trough 13. Due to the flow, the smallest milk movements and the lowest proportion of air bubbles in the milk to be measured can be observed in this area, which means that the measurement provides particularly constant and noise-free measurement results. For an arrangement of the electrodes 21, 22 in an area favorable to flow, it is advantageous if the front wall 131 extends vertically or almost vertically.

Another measure that ensures constant and noise-free measurement results is that the height of the barrier 14 and thus the level of the milk in the measurement trough 13 is dimensioned in such a way that the electrode and sensor arrangement 20 is sufficiently covered with milk at all times during the measurement.

The impedance electrodes 21, the conductivity electrodes 22 and the temperature sensor 23 are inserted into the measurement trough 13, for example, glued in sealingly or guided through appropriately inserted seals.

In the example shown, an evaluation unit 30 is arranged directly below the electrode and sensor arrangement 20 and below the measurement trough 13, in order to allow the shortest possible cable length between the electrodes 21, 22 and the evaluation unit 30. The electrodes 21, 22 and the temperature sensor 23 can be connected to the evaluation unit 30 via plugs, but direct soldering of the connections of the electrode and sensor arrangement 20 into a circuit board of the evaluation unit 30 is preferred.

The evaluation unit 30 comprises an impedance measuring circuit 31, which is connected to the impedance electrodes 21 to perform the impedance measurement. The result of the impedance measurement 31 is a preferably complex impedance of the milk between the impedance electrodes 21. The complex impedance can be indicated, for example, by real and imaginary parts or by an absolute value and a phase position.

The evaluation unit 30 also includes a conductivity measuring circuit 32, which is connected to the conductivity electrodes 22 and determines an impedance at a low measuring frequency. In this case the impedance is given by a resistance value which corresponds to the real part of a complex impedance.

The measured values are made available in analog and/or digital form at a connection 33 for further processing. In order to obtain particularly meaningful measured values, a temperature-stabilized measurement is optionally provided, which is achieved by an insulating hood 34 which insulates the evaluation unit 30 or at least its impedance measuring circuit 31 and conductivity measuring circuit 32 with respect to the temperature from the environment and which comprises a heating and/or cooling circuit with which a constant temperature is maintained for the measuring circuits mentioned.

Figure 2:
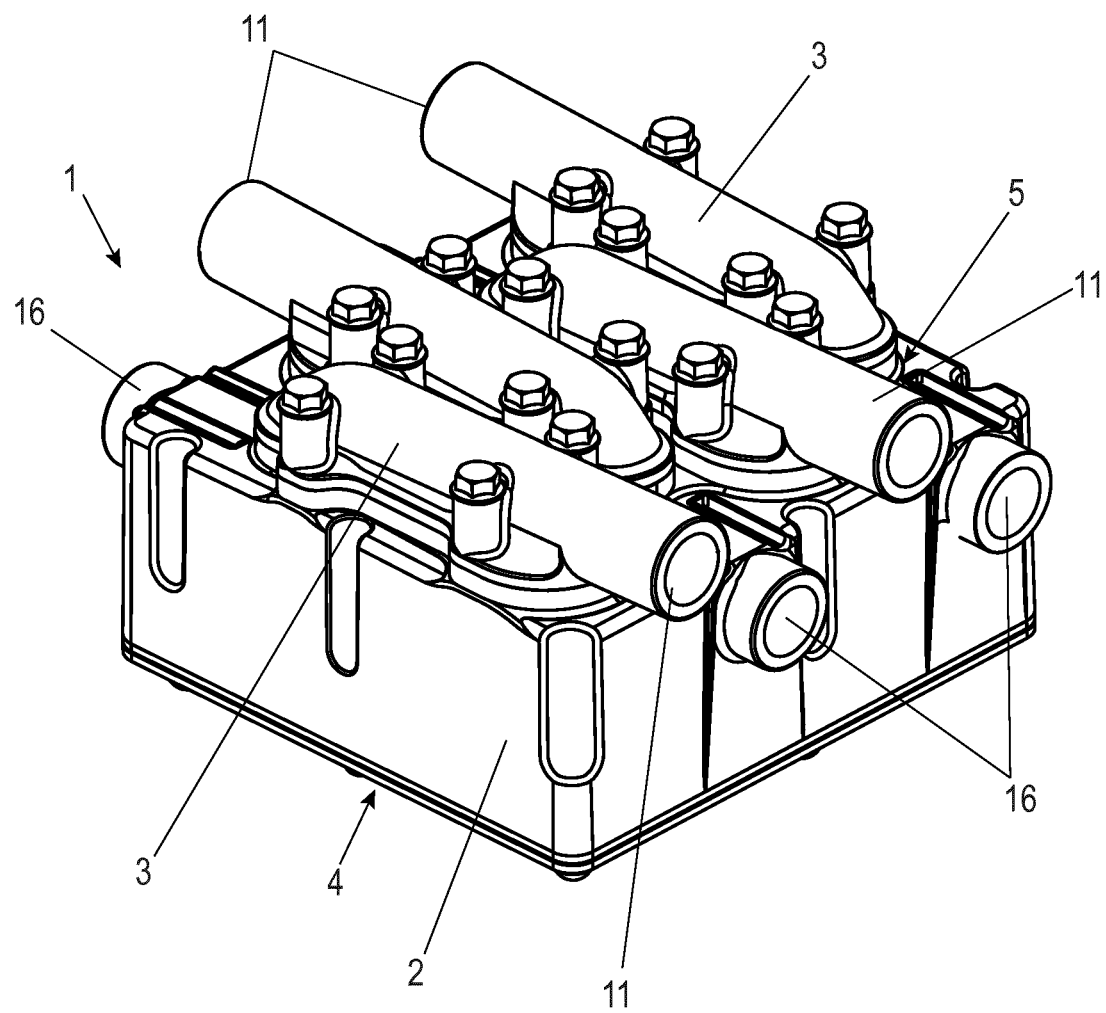
FIG. 2 shows a measuring arrangement with four measuring cells in an isometric general view.

FIG. 2 shows in an isometric schematic view a measuring arrangement 1, which comprises several measuring cells 10, in this case four measuring cells 10. The measuring cells 10 can basically be constructed as shown in the exemplary embodiment in FIG. 1. In this and the following figure the same reference numerals indicate the same or equally acting elements as in the exemplary embodiment of FIG. 1.

The measuring arrangement comprises a multi-part housing which has a common housing base body 2, onto which 10 separate upper housing parts 3 are mounted for each measuring cell. A common lower cover 4 is provided at the bottom. The individual upper housing parts 3 are sealed by individual or, as here, a common seal 5 placed on the housing base body 2.

Figure 3:
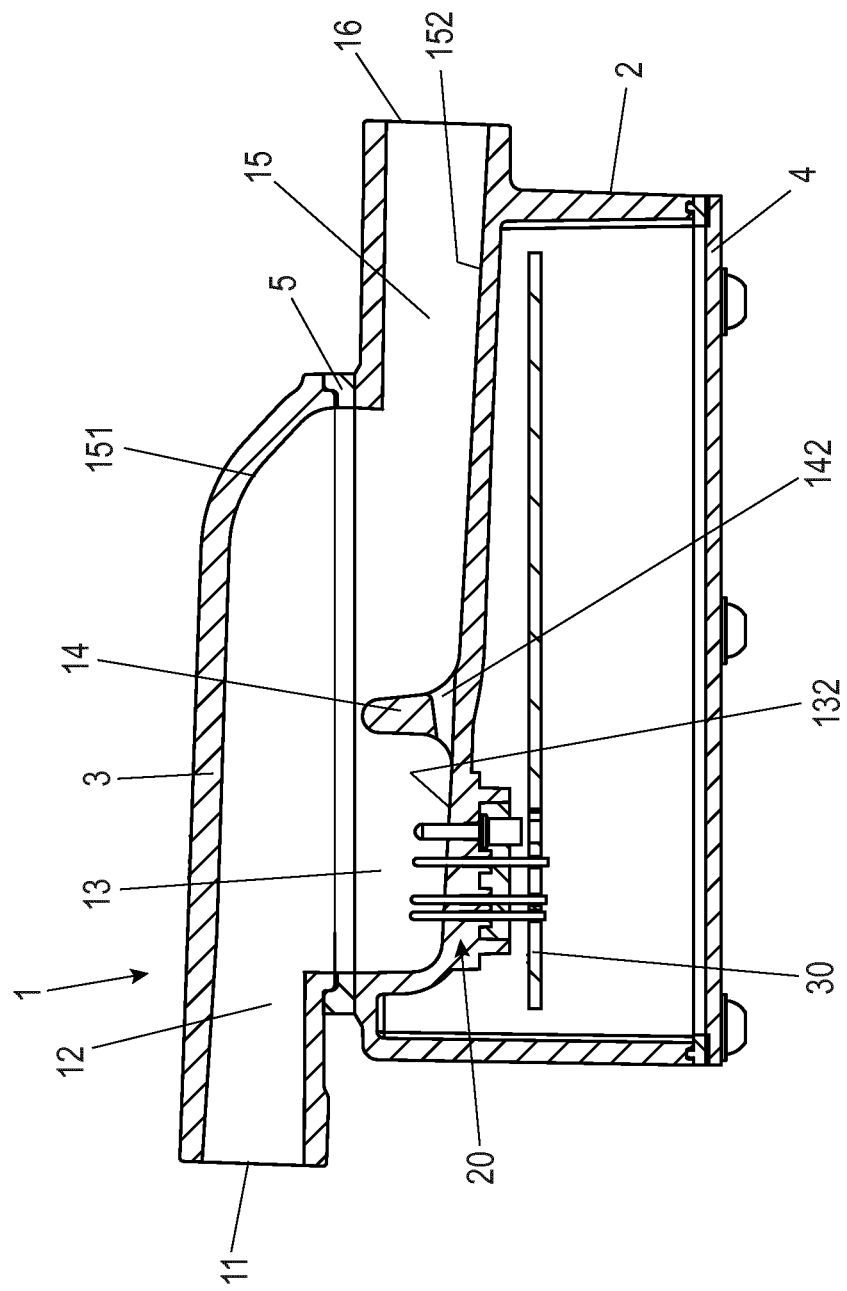
FIG. 3 shows a sectional view of the measuring arrangement according to FIG. 2.

FIG. 3 shows a vertical cross-section through the measuring arrangement 1 of FIG. 2. In this sectional view, the separation of the individual measuring cells 10 by the multi-part housing 2 is clearly visible. In the respective upper housing part 3, the inlet 11 and the inlet channel 12 are formed, as well as part of the contour of the baffle wall 151. In the housing base body 2, the contours of the measurement trough 13, the barrier 14 and the further contour of the outlet channel 15 as well as the outlet 16 are respectively formed for all four measuring cells 10. In contrast to the exemplary embodiment in FIG. 1, in the present case a bottom 132 of the measurement trough 13, the discharge channel 142 of the barrier 14 and a bottom 152 of the outlet channel 15 are designed to be inclined, so that drainage of the milk 43 from the measurement trough 13 and the milk 44 in the discharge channel 142 can be supported.

In the example shown, measuring cells 10 are arranged alternately in measuring arrangement 1, rotated by 180 degrees from the vertical. This makes it possible to position measuring cells 10 at a small distance from each other and still have sufficient installation space available for connecting the inlets 11 and the outlets 16.

Below the housing base body 2, covered by the lower cover 4, there is installation space for the evaluation unit(s) 30, which can be designed separately in each case for each of the measuring cells 10 or also on a common circuit board. In this case, a separate impedance measuring circuit 31 and a separate conductivity measuring circuit 32 can be provided for each measuring cell, or the individual electrodes 21, 22 of the sensor arrangement 20 can be coupled via a multiplexer to a jointly used impedance measuring circuit 31 and a jointly used conductivity measuring circuit 32. In the lower cover 4 or laterally in the lower area of the housing base body 2, individual or joint connections are also provided for supplying power to the measuring cells 10 and for transmitting the measured values.

The invention claimed is:

1. A milk measurement cell comprising:
an inlet having a lower edge at an inlet height;
a cavity in fluid communication with the inlet;
an outlet in fluid communication with the cavity;
a barrier having a peak at a barrier peak height that is lower than the inlet height, and the barrier extends upward from a bottom of the cavity to define a measurement trough on an inlet side, and a discharge channel on an outlet side, wherein, as seen in a direction of milk flow, the measurement trough is limited by the barrier on a rear side of the measurement trough; and
a measurement electrode disposed in the measurement trough.

2. The milk measurement cell of claim 1, and further comprising:
an inlet channel in fluid communication with the inlet; and
a front wall at least partially defines the cavity, and the front wall is disposed at an angle of at least about 80° to the inlet channel.

3. The milk measurement cell of claim 1, and further comprising:
an inlet channel in fluid communication with the inlet, and the inlet channel includes an upstream end and a downstream end, and the inlet channel is disposed at a downward angle toward the downstream end when the milk measurement cell is in an operating position.

4. The milk measurement cell of claim 1, and further comprising:
a front wall at least partially defining the measurement trough, and the front wall is disposed substantially vertically when the milk measurement cell is in an operating position.

5. The milk measurement cell of claim 1, and further comprising:
an inlet channel in fluid communication with the inlet; and
a front wall at least partially defining the cavity and an edge adjacent to the inlet channel.

6. The milk measurement cell of claim 1, wherein the electrode is arranged in an upstream portion of the measurement trough.

7. The milk measurement cell of claim 1, and further comprising:
an inlet channel in fluid communication with the inlet; and
an inclined rear wall disposed downstream from the inlet channel.

8. The milk measurement cell of claim 1, wherein the barrier defines a discharge channel in fluid communication between the cavity and the outlet.

9. The milk measurement cell of claim 1, wherein the measurement trough has a bottom and the barrier defines a discharge channel, and the measurement trough bottom and the discharge channel are inclined downward toward the outlet when in an operating position.

10. The milk measurement cell of claim 1, wherein the electrode is an impedance electrode.

11. The milk measurement cell of claim 1, wherein the electrode is a conductance electrode.

12. The milk measurement cell of claim 1, and further comprising:
a temperature sensor disposed in the measurement trough.

13. The milk measurement cell of claim 1, and further comprising:
a temperature sensor formed integrally with the electrode.

14. The milk measurement cell of claim 1, and further comprising:
an inductance evaluation circuit disposed below the measuring trough and in communication with the electrode.

15. The milk measurement cell of claim 1, and further comprising:
a conductance evaluation circuit disposed below the measuring trough and in communication with the electrode.

16. A milk measuring arrangement comprising:
a plurality of milk measuring cells, and at least two of the milk measuring cells each comprise:
an inlet having a lower edge at an inlet height;
a cavity in fluid communication with the inlet;
an outlet in fluid communication with the cavity;
a barrier having a peak at a barrier peak height that is lower than the inlet height, and the barrier extends upward from a bottom of the cavity to define a measurement trough on an inlet side, and a discharge channel on an outlet side, wherein, as seen in a direction of milk flow, the measurement trough is limited by the barrier on a rear side of the measurement trough; and
a measurement electrode disposed in the measurement trough.

17. The milk measuring arrangement of claim 16, wherein the inlet of one of the milk measuring cells is disposed in an opposite flow direction of a flow direction of an inlet of an adjacent milk measuring cell.

18. The milk measuring arrangement of claim 16, wherein at least two of the milk measuring cells are at least partially disposed in a common housing base body.

19. The milk measuring arrangement of claim 16, wherein at least two of the milk measuring cells are at least partially disposed in a common upper housing.

20. The milk measuring arrangement of claim 16, and further comprising:
a common evaluation unit in communication with each of the milk measuring cell measurement electrodes.

* * * * *